(12) United States Patent
Teng et al.

(10) Patent No.: US 8,989,275 B2
(45) Date of Patent: Mar. 24, 2015

(54) VIDEO PROCESSING ARCHITECTURE

(75) Inventors: Chia-Yuan Teng, San Diego, CA (US);
Dan M. Chuang, San Diego, CA (US);
Gokce Dane, San Diego, CA (US);
Raghavendra C. Nagaraj, San Diego,
CA (US); Vladan Andrijanic, San
Diego, CA (US); Yiu-Wing Leung,
Ontario (CA)

(73) Assignee: QUALCOMM Incorporated, San
Diego, CA (US)

( * ) Notice: Subject to any disclaimer, the term of this
patent is extended or adjusted under 35
U.S.C. 154(b) by 1130 days.

(21) Appl. No.: 12/943,446

(22) Filed: Nov. 10, 2010

(65) Prior Publication Data

US 2012/0114045 A1 May 10, 2012

(51) Int. Cl.
*H04N 7/12* (2006.01)
*H04N 19/90* (2014.01)
*H04N 19/61* (2014.01)
*H04N 19/102* (2014.01)
*H04N 19/176* (2014.01)
(Continued)

(52) U.S. Cl.
CPC .......... *H04N 19/00945* (2013.01); *H04N 7/50*
(2013.01); *H04N 7/26106* (2013.01); *H04N
7/26244* (2013.01); *H04N 7/26111* (2013.01);
*H04N 19/00169* (2013.01); *H04N 19/00296*
(2013.01); *H04N 19/00078* (2013.01); *H04N
19/00272* (2013.01); *H04N 19/00278*
(2013.01); *H04N 19/00484* (2013.01); *H04N
19/00763* (2013.01); *H04N 19/00303*
(2013.01); *H04N 19/00545* (2013.01); *G06T
9/005* (2013.01)

USPC ............ 375/240.24; 375/240.23; 375/240.12;
382/235; 382/238; 382/245; 382/244; 382/246

(58) Field of Classification Search
CPC . H04N 7/50; H04N 7/26106; H04N 7/26244;
H04N 7/26111; G06T 9/005
USPC ........... 375/240.24, 240.23, 240.12; 382/235,
382/238, 245, 244, 246
See application file for complete search history.

(56) References Cited

U.S. PATENT DOCUMENTS 4,758,881 A 7/1988 Laspada
5,680,161 A 10/1997 Lehman et al.
(Continued)

OTHER PUBLICATIONS

Richardson, "Video CODEC Design: Developing Image and Video
Compression Systems", Jan. 2002, John Wiley & Sons Ltd,
XP55016540, ISBN: 978-0-47-084783-1, pp. 271-288.*
(Continued)

*Primary Examiner* — Shawn An
(74) *Attorney, Agent, or Firm* — Todd E. Marlette

(57) ABSTRACT

A method for video processing may include receiving video
data units, and compressing the video data units to generate
compressed video data units that have a variable size. The
method may also include storing the compressed video data
units contiguously in a memory in memory segments that
have a fixed size, where the size of at least one of the compressed video data units is indivisible by the fixed size of the
memory segments, and where a portion of the indivisible
compressed video data unit is stored with a portion of another
compressed video data unit in one of the memory segments.
The method may also include determining data storage information associated with the compressed video data units, and
storing the data storage information in the memory. A system
may have a video processing architecture designed to support
the method.

36 Claims, 9 Drawing Sheets

(51) Int. Cl.
*H04N 19/146* (2014.01)
*H04N 19/18* (2014.01)
*H04N 19/12* (2014.01)
*H04N 19/174* (2014.01)
*H04N 19/423* (2014.01)
*H04N 19/593* (2014.01)
*H04N 19/182* (2014.01)
*H04N 19/46* (2014.01)
*G06T 9/00* (2006.01)

(56) References Cited

U.S. PATENT DOCUMENTS

| | | | |
|---|---|---|---|
| 5,745,608 | A | 4/1998 | Rust |
| 5,761,536 | A | 6/1998 | Franaszek |
| 5,801,841 | A * | 9/1998 | Suzuki .................. 382/234 |
| 6,775,742 | B2 * | 8/2004 | Huffman et al. ............. 711/118 |
| 7,450,774 | B2 * | 11/2008 | Hahm et al. ................. 382/245 |
| 2005/0226243 | A1 | 10/2005 | Zhai et al. |
| 2008/0060042 | A1 | 3/2008 | Fung |
| 2009/0003714 | A1 * | 1/2009 | Subramaniam .............. 382/232 |
| 2009/0132782 | A1 * | 5/2009 | Jeffrey ..................... 711/173 |

OTHER PUBLICATIONS

Ortega et al, "Multimedia over IP and Wireless Networks: Compression, Networking, and Systems, Mechanisms for Adapting Compressed Multimedia to Varying Bandwidth Conditions", Mar. 2007, XP002621542, ISBN: 978-0-12-088480-3, pp. 81-116.*

International Search Report and Written Opinion—PCT/US2011/059648—ISA/EPO—Feb. 2, 2012.

Ortega, A et al., "Multimedia over IP and Wireless Networks: Compression, Networking, and Systems, Mechanisms for Adapting Compressed Multimedia to Varying Bandwidth Conditions", Mar. 30, 2007, Multimedia Over IP and Wireless Networks : Compression, Networking, and Systems, Amsterdam : Elsevier, NL, pp. 81-116, XP002621542, ISBN: 978-0-12-088480-3 section 4.4.1 "Rate Control".

Pennebaker, W.B., et al., "JPEG Still Image Data Compression Standard; Passage", Jan. 1, 1993, JPEG Still Image Data Compression Standard, New York, Van Nostrand Reinhold, US, pp. 67-73, XP008120831, ISBN: 978-0-442-01272-4 Section 5.2. "Image compression models".

Richardson, I.E.G., "Video CODEC Design: Developing Image and Video Compression Systems" In: "Video CODEC Design: Developing Image and Video Compression Systems", Jan. 1, 2002, John Wiley & Sons, Ltd, XP55016540, ISBN: 978-0-47-084783-1 pp. 271-288, section 13.2. "Video Codec Interface" section 13.2.2 Coded Data In/Out figures 13.1, 13.6 section 13.2.4 "Status Parameters".

Yun, Q.S., et al., "Image and Video Compression for Multimedia Engineering: Chapter 16 Digital Video Coding Standards—MPEG-1/2 Video" In : "Image and Video Compression for Multimedia Engineering: Chapter 16 Digital Video Coding Standards—MPEG-1/2 Video", Jan. 1, 1999, CRC Press, XP55016552, ISBN: 978-1-42-004979-4 pp. 1-34.

* cited by examiner

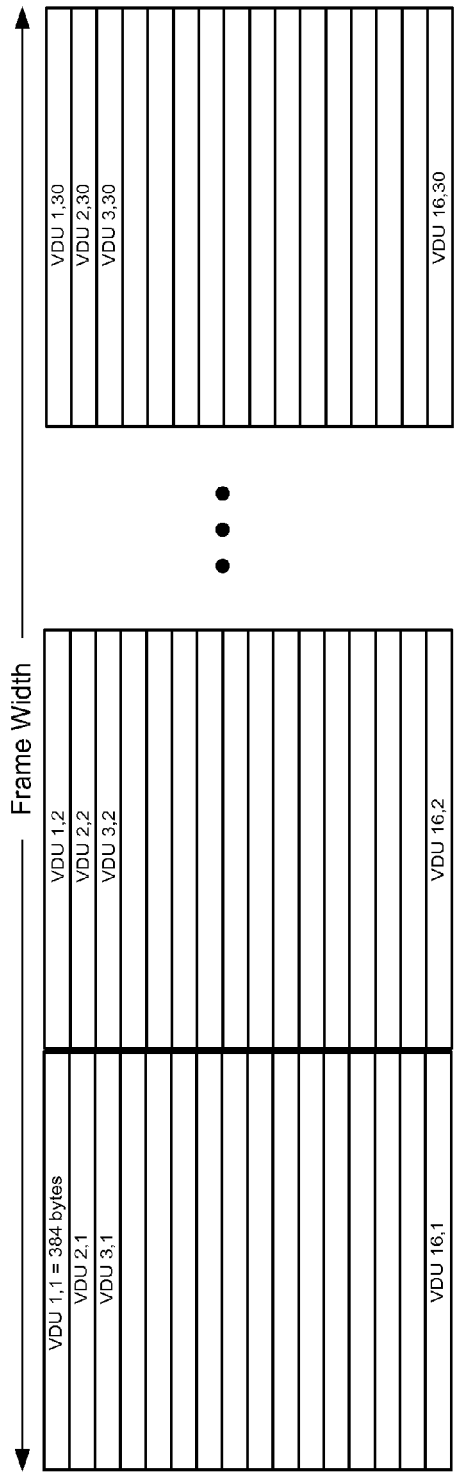
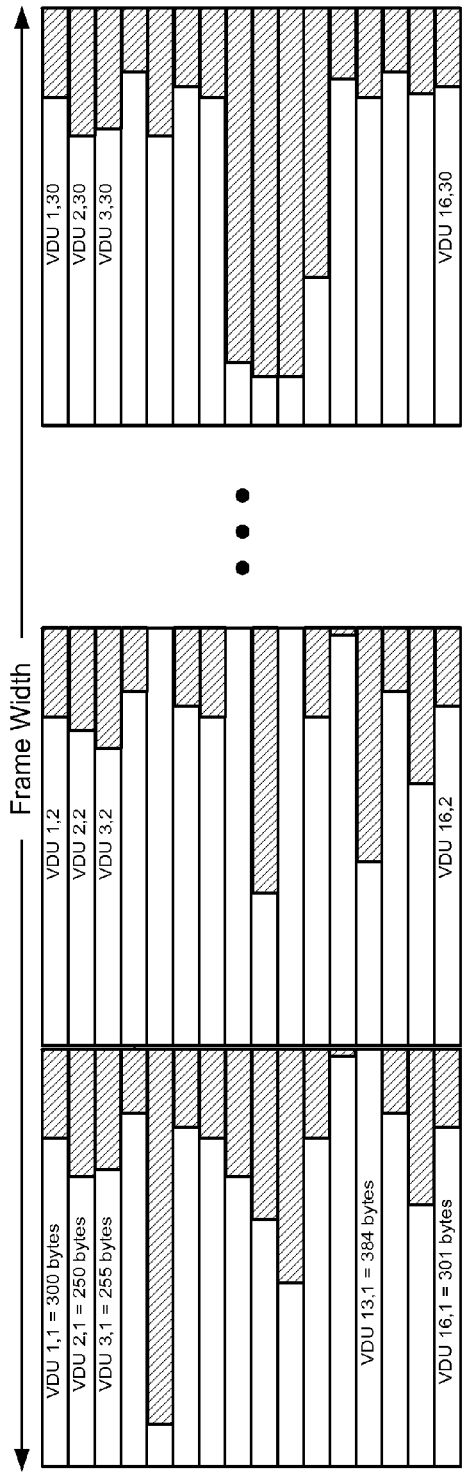
FIG. 5A
FIG. 5B

VIDEO PROCESSING ARCHITECTURE

TECHNICAL FIELD

This disclosure relates to video processing systems and, more particularly, techniques for data compression and storage in video processing systems.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, tablet computers, cellular or satellite radio telephones, and the like. Digital video devices often implement relatively complex video compression techniques, such as MPEG-2, MPEG-4, or ITU-T H.264/MPEG-4, Part 100, Advanced Video Coding (AVC), to store, transmit, and receive digital video information more efficiently. These and other video compression techniques often utilize spatial prediction and temporal prediction to reduce or remove redundancy inherent in video sequences.

Various data processing units included in digital video devices also transfer uncompressed video data from one module to another within a single data processing unit, between and amongst multiple data processing units on the device, or between memory and the data processing units. Such transfers of uncompressed data do not incur the additional processing cycles and memory requirements inherent in the video compression techniques mentioned above, but the transmission of the uncompressed video data is less efficient.

SUMMARY

In general, this disclosure describes a video processing architecture that may be used in a video processing system that includes multiple data processing units that receive, process, and store video, image, and/or graphics data. The video processing architecture described herein may reduce the amount of video, image, or graphics data that is transferred from one video data processing unit to another. The reduction in the amount of video or image data that is transferred between the data processing units may, in turn, reduce the power consumption and increase the performance of the video processing system. Such power and performance improvements may be especially useful in video processing systems that handle high volumes of multimedia data, such as high definition (HD) video, and other systems that produce and/or consume large amounts of graphics content.

According to the techniques described in this disclosure, rather than storing and transmitting uncompressed data between the data processing units, the data is compressed and written-out to memory by a first data processing unit, and is subsequently fetched-in from the memory and decompressed by a second data processing unit. As used herein, the term write-out generally refers to writing a compressed bitstream from a first data processing unit to memory, and the term fetch-in generally refers to fetching the compressed bitstream from memory for use in a second data processing unit. Writing and fetching compressed video data may reduce bandwidth needed for communication of video data between different processing units.

In one aspect, this disclosure provides a method that includes receiving, at a video data processing unit of a video processing apparatus, video data units, and compressing the video data units to generate compressed video data units that have a variable size. The method also includes storing the compressed video data units contiguously in a memory in memory segments that have a fixed size, where the size of at least one of the compressed video data units is indivisible by the fixed size of the memory segments, and where a portion of the indivisible compressed video data unit is stored with a portion of another compressed video data unit in one of the memory segments. The method further includes determining data storage information associated with the compressed video data units that comprises a number of memory segments used to store the compressed video data units. The method also includes storing the data storage information in the memory.

In another aspect, this disclosure provides an apparatus having a memory and a video data processing module. The video data processing module is configured to receive video data units, and compress the video data units to generate compressed video data units that have a variable size. The video data processing module is also configured to store the compressed video data units contiguously in the memory in memory segments that have a fixed size, where the size of at least one of the compressed video data units is indivisible by the fixed size of the memory segments, and where a portion of the indivisible compressed video data unit is stored with a portion of another compressed video data unit in one of the memory segments. The video data processing module is further configured to determine data storage information associated with the compressed video data units that comprises a number of memory segments used to store the compressed video data units, and to store the data storage information in the memory.

In another aspect, this disclosure provides an apparatus having means for receiving video data units and means for compressing the video data units to generate compressed video data units that have a variable size. The apparatus also has means for storing the compressed video data units contiguously in a memory in memory segments that have a fixed size, where the size of at least one of the compressed video data units is indivisible by the fixed size of the memory segments, and where a portion of the indivisible compressed video data unit is stored with a portion of another compressed video data unit in one of the memory segments. The apparatus further has means for determining data storage information associated with the compressed video data units that comprises a number of memory segments used to store the compressed video data units. The apparatus also has means for storing the data storage information in the memory.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium, e.g., a non-transitory storage medium, comprising instructions that upon execution cause a processor to receive video data units, and compress the video data units to generate compressed video data units that have a variable size. The instructions also cause the processor to store the compressed video data units contiguously in a memory in memory segments that have a fixed size, where the size of at least one of the compressed video data units is indivisible by the fixed size of the memory segments, and where a portion of the indivisible compressed video data unit is stored with a portion of another compressed video data unit in one of the memory segments. The instructions further cause the processor to determine data storage information associated with the compressed video data units that comprises a number of memory segments used to store the compressed video data units, and to store the data storage information in the memory.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 5A-5D are conceptual diagrams illustrating example uncompressed, compressed, and packed video data units.

Like reference symbols in the various drawings indicate like elements.

DETAILED DESCRIPTION

Figure 1:
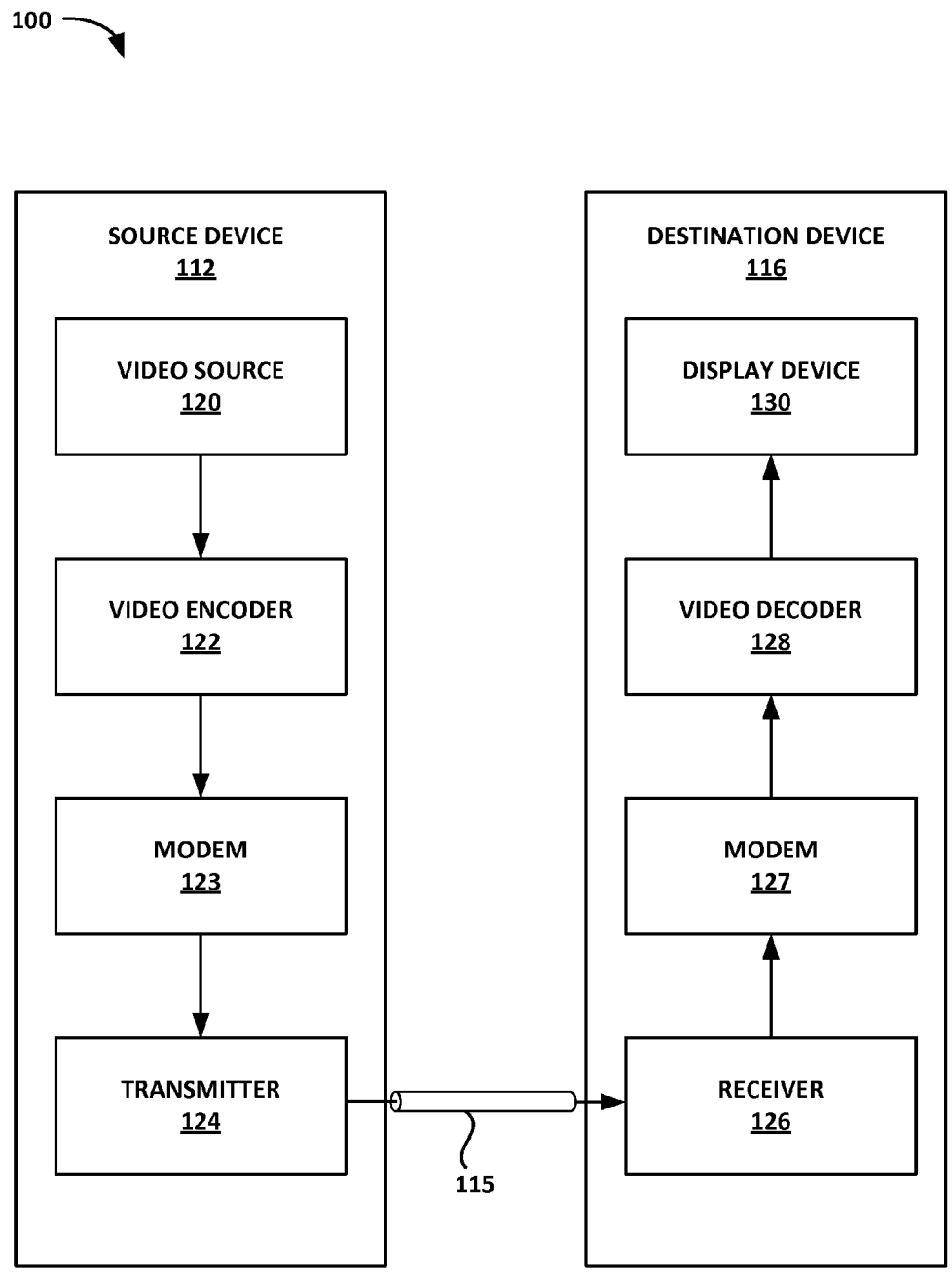
FIG. 1 is a block diagram illustrating an example video encoding and decoding system.

FIG. 1 is a block diagram illustrating an example video encoding and decoding system 100 that may implement the techniques of this disclosure. As shown in FIG. 1, system 100 includes a source device 112 that transmits encoded video to a destination device 116 via a communication channel 115. Source device 112 and destination device 116 may comprise any of a wide range of devices. In some cases, source device 112 and destination device 116 may comprise wireless communication devices, such as wireless handsets, so-called cellular or satellite radio telephones, or any wireless devices that can communicate video information over a communication channel 115, in which case communication channel 115 is wireless. The techniques of this disclosure, however, which generally relate to reducing the amount of video data transferred between data processing units, are not necessarily limited to wireless applications or settings. Furthermore, as used herein, the terms video, video data, and the like generally refer to video-, image-, and or graphics-related data, and as such, may include one or more frames of generated or captured video (including, for example, 2-Dimensional or 3-Dimensional video), one or more generated or captured images, one or more computer graphics, and the like.

In the example of FIG. 1, source device 112 may include a video source 120, video encoder 122, a modulator/demodulator (modem) 123, and a transmitter 124. Destination device 116 may include a receiver 126, a modem 127, a video decoder 128, and a display device 130. Video encoder 122 of source device 112 may be configured to encode video data from video source 120 using a particular type of video coding. Similarly, video decoder 128 of destination device 116 may be configured to decode video data from video encoder 122 using the particular type of video coding.

In general, source device 112 generates coded video data for transmission to destination device 116. In some cases, however, devices 112, 116 may operate in a substantially symmetrical manner. For example, each of devices 112, 116 may include video encoding and decoding components. Hence, system 100 may support one-way or two-way video transmission between video devices 112, 116, e.g., for video streaming, video playback, video broadcasting, or video telephony.

Video source 120 of source device 112 may include a video capture device, such as a video camera, a video archive containing previously captured video, or a video feed from a video content provider. As a further alternative, video source 120 may generate computer graphics-based data as the source video, or a combination of live video, archived video, and computer-generated video. In some cases, if video source 120 is a video camera, source device 112 and destination device 116 may form so-called camera phones or video phones. In each case, the captured, pre-captured, or computer-generated video may be encoded by video encoder 122 using a particular coding technique. The encoded video information may then be modulated by modem 123 according to a communication technique, e.g., such as code division multiple access (CDMA), orthogonal frequency division multiplex (OFDM), or another communication technique, and transmitted to destination device 116 via transmitter 124. Modem 123 may include various mixers, filters, amplifiers, or other components designed for signal modulation. Transmitter 124 may include circuits designed for transmitting data, including amplifiers, filters, and one or more antennas.

Receiver 126 of destination device 116 receives information over channel 115, and modem 127 demodulates the information. The video decoding process performed by video decoder 128 may perform inverse quantization in reconstructing the video sequence, such as by using the particular coding technique utilized by video encoder 122. Display device 130 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 115 may comprise any wireless or wired communication medium, such as a radio frequency (RF) spectrum or one or more physical transmission lines, or any combination of wireless and wired media. Communication channel 115 may form part of a packet-based network, such as a local area network, a wide-area network, or a global network such as the Internet. Communication channel 115 generally represents any suitable communication medium, or collection of different communication media, for transmitting video data from source device 112 to destination device 116.

Video encoder 122 and video decoder 128 may operate according to a video compression standard such as the ITU-T H.264 standard, alternatively referred to as MPEG-4, Part 100, Advanced Video Coding (AVC). Although not shown in FIG. 1, in some aspects, video encoder 122 and video decoder 128 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 122 and video decoder 128 each may be implemented as one or more microprocessors, digital signal processors (DSPs), application specific integrated circuits (ASICs), field programmable gate arrays (FPGAs), discrete logic, software, hardware, firmware, or any combinations thereof. Each of video encoder 122 and video decoder 128 may be included in one or more encoders or decoders, either of which may be integrated as part of a combined encoder/decoder (CODEC) in a respective mobile device, subscriber device, broadcast device, server, or the like.

In some cases, the video data that is transferred between any of the above-mentioned data processing units (e.g., between video decoder 128 and display device 130) or within any of the above-mentioned data processing units (e.g., between a first video processing module of display device 130 and a second video processing module of display device 130) may be relatively substantial. This is true especially in cases where the data being transferred includes high definition video or the like, or in cases where high frame rate data is transferred such as 60, 120, or 240 frames per second. According to the techniques of this disclosure, rather than transferring the video data between the data processing units in an uncompressed form, the video data may be compressed and stored contiguously in a memory to reduce the amount of video data that is transferred between the data processing units.

Figure 2:
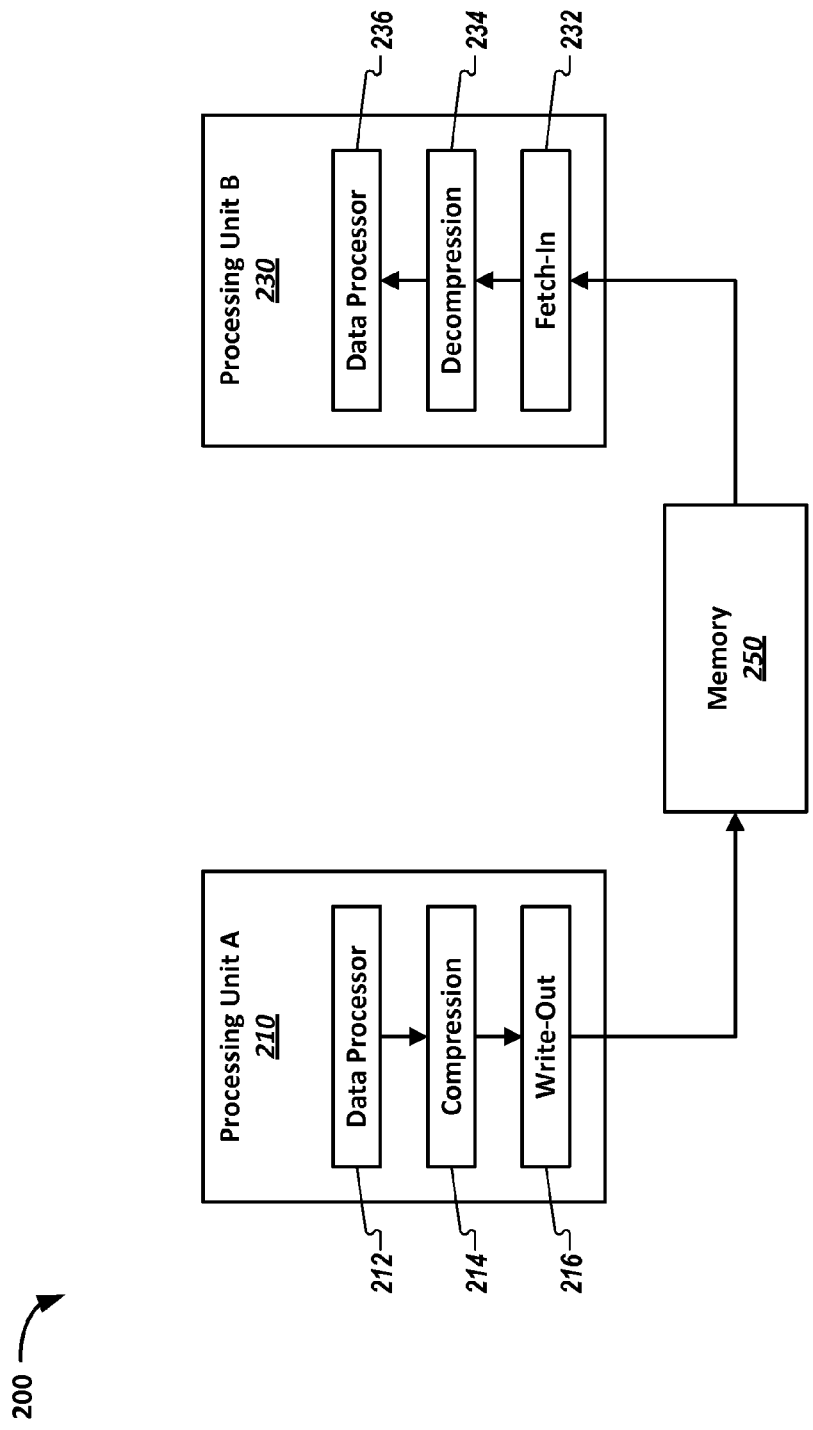
FIG. 2 is a conceptual diagram illustrating an example video processing architecture consistent with this disclosure.

FIG. 2 is a conceptual diagram illustrating an example video processing architecture consistent with this disclosure. The example architecture includes a first processing unit 210 (Processing Unit A) and a second processing unit 230 (Processing Unit B). The processing units may be any appropriate video data processing unit of a video processing system. First processing unit 210 and second processing unit 230 are operatively coupled via a memory 250.

First processing unit 210 includes a data processor module 212, a compression module 214, and a write-out module 216. In some implementations, first processing unit 210 may also include a fetch-in module (not shown) and/or a decompression module (not shown). Data processor module 212 may perform any appropriate processing of the video data that is available to the processing unit. Example video processing functions may include, for example, frame rotation, scaling, color correction, video smoothing, video sharpening, or the like. In some implementations, data processor module 212 may include additional or alternative video processing functions and/or combinations of video processing functions.

Upon completion of video processing, first processing unit 210 may prepare the video data for transmission to second processing unit 230. Such preparation may include compression of the video data, e.g., using compression module 214, and writing the video data out to memory 250, e.g., using write-out module 216. The compressed video data may be written to memory 250 using a number of memory segments (e.g., beats of data, bursts of data, or other units of data), and the number of memory segments used to write the video data to memory may also be written to memory, as is described in greater detail below. In some implementations, the compression and write-out procedures may be performed using a single module, or may be performed using additional or different modules than those shown in the example architecture.

As used herein the term "beat" generally refers to a unit of data that includes a specific number of bytes of data, e.g., 16 or 32 bytes, and the term "burst" generally refers to a unit of data that includes a specific number of beats, e.g., 16 beats. A 16-beat burst of data, therefore, may correspond to 512 bytes of data in an architecture where a beat is equal to 32 bytes of data. The respective sizes of beats and/or bursts may be architecture-specific, such that in various architectures, the number of bytes included in a beat or in a burst may be different.

Compression module 214 may be implemented using relatively low complexity components and relatively small memory for compression, and may be implemented to perform the compression techniques described in greater detail below. In some implementations, compression module 214 may perform lossy compression, lossless compression, or both. In some implementations, compression module 214 may compress the video data in a manner that allows random access to the compressed video data. Compression module 214 may also support various architectures, such as tile and/or line-based video data architectures.

Second processing unit 230 includes a fetch-in module 232, a decompression module 234, and a data processor 236. In some implementations, second processing unit 230 may also include a write-out module (not shown) and/or a compression module (not shown). To retrieve the video data that was written-out to memory 250 by first processing unit 210, fetch-in module 232 may retrieve the number of memory segments (e.g., beats or bursts) used to write the compressed video data to memory, and retrieve the compressed video data from the memory, as is described in greater detail below.

Following fetch-in, if the video data was compressed before being written out by write-out module 216, the compressed video data may be decompressed using decompression module 234. Decompression module 234 may generally follow inverse compression procedures to those performed by compression module 214 to restore the video data to an uncompressed format. After decompression, the video data may be processed in an appropriate manner using data processor 236, which may perform, e.g., frame rotation, scaling, color correction, video smoothing, video sharpening, or the like.

The video processing architecture described above may serve to reduce the amount of video data that is transmitted and received between two video processing units (e.g., first processing unit 210 and second processing unit 230). The reduction in the amount of compressed video data that is transferred between the processing units in turn reduces the power consumption and increases the performance of the system. Such power and performance improvements may be useful in systems that produce and consume high volumes of multimedia data and/or graphics content, and may be especially useful in systems with limited power resources such as portable and/or mobile devices powered by rechargeable batteries or the like, or in consumer electronics devices such as high-definition televisions (HDTVs), where high frame rates and high resolution video data is processed.

Figure 3:
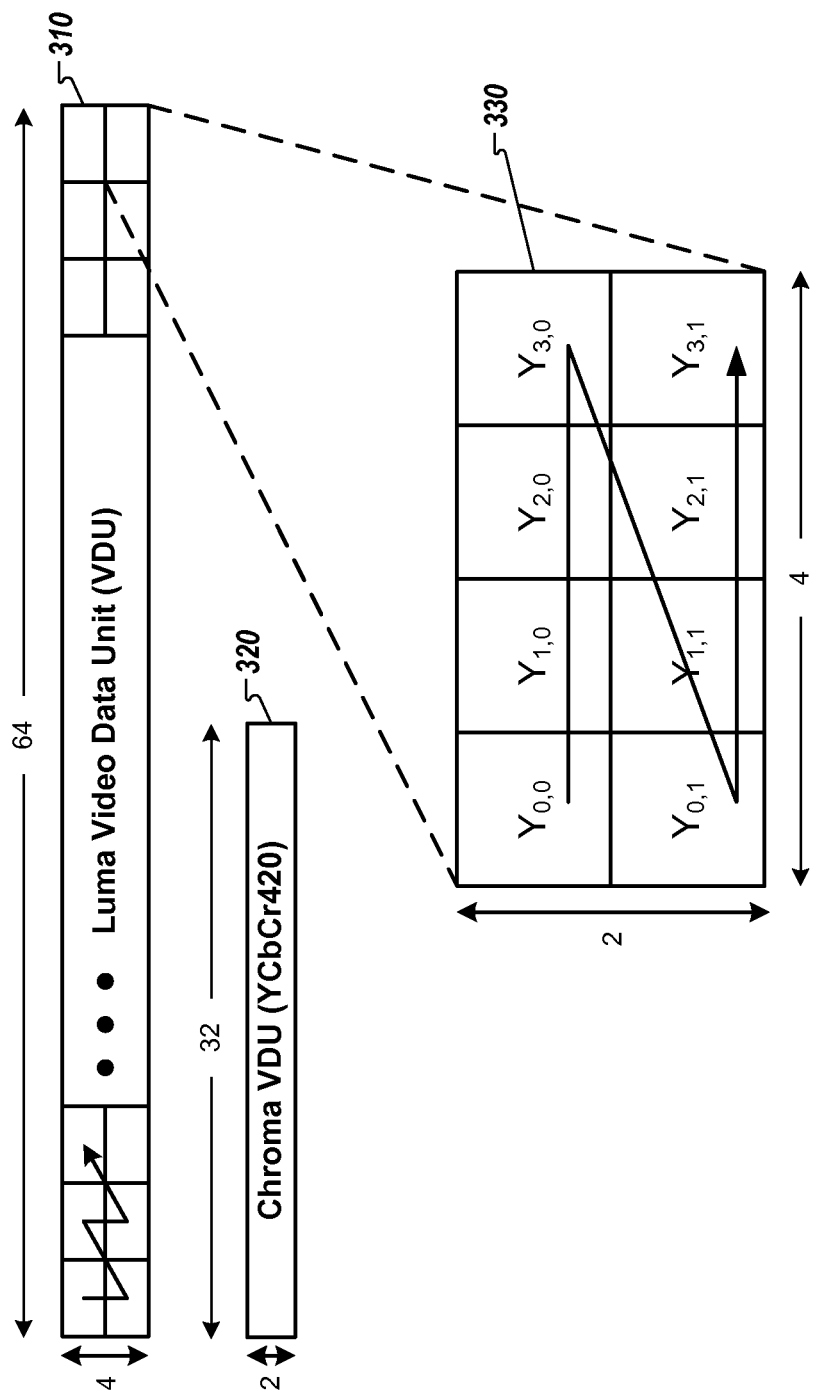
FIG. 3 is a conceptual diagram illustrating example video data units for use in the video processing architecture.

FIG. 3 is a conceptual diagram illustrating example video data units for use in the video processing architecture described herein. The video processing architecture utilizes various sizes and types of video data units 310, 320 that are made up of smaller blocks 330 that contain a number of pixels (e.g., two rows of pixels having four pixels each, which may be described as a 4×2 block). The examples shown herein illustrate 4×2 blocks, but it should be understood that other sizes of blocks (e.g., 8×1, 2×2, etc.) are also possible.

In some implementations, the video data units may be self-decodable in that there is no dependency between video data units. In other words, in such implementations, only pixels contained in a current video data unit are used to predict other pixels in the current video data unit, and other pixels from other video data units are not used to predict pixels in the current video data unit.

Each of video data units 310, 320 may contain a specific number of blocks, and may be used to provide accessibility to a specific area of an image frame. For example, video data unit 310 is a Luma video data unit that is 64×4 pixels in size, and therefore includes 32 4×2 blocks configured in a 16×2 pattern. As another example, video data unit 320 is a Chroma video data unit that is 32×2 pixels in size, and therefore includes 8 4×2 blocks configured in an 8×1 pattern. Using these examples, a video frame that is 1920 pixels wide may be represented using 30 video data units that are 64 pixels wide (e.g., Luma video data unit 310) and 60 video data units that are 32 pixels wide (e.g., Chroma video data unit 320). Different video formats may have different video data unit sizes, which may be designed to comply with the appropriate architecture for a given video processing unit. As such, it should be understood that the sizes and configurations of video data units 310, 320 are shown for illustrative purposes only, and should not be considered to limit the scope of this disclosure.

The compression techniques described herein may process pixels in units of blocks, e.g., block 330. As used herein, a block is the smallest video data unit, and has a fixed size (e.g., 4×2 pixels) for all color components or data planes (e.g., Luma, Chroma, A (alpha), R (red), G (green), and B (blue) color planes). In some implementations, a block cannot be self-decoded. In other words, there may be some dependency between previous blocks. As will be described in greater detail below, the predictor in the first column of a block comes from the previous block, and therefore, to predict pixels in a current block, previous blocks are decoded and used in predicting the pixels in the current block. The pixels in a block may be processed in raster scan order (as shown by the arrow in block 330), and the blocks in a video data unit may be processed column-wise (as shown by the arrow in video data unit 310). In other implementations, the blocks in a video data unit may be processed in raster scan order.

The blocks may be compressed, e.g., by compression module 214 of Processing Unit A of FIG. 2, using either lossless or lossy modes. The compression techniques for the lossless and lossy modes include both prediction and indexing of the pixels. In lossless mode, the intensity value of a pixel at the (i,j)th location, i.e. the intensity value of pixel $Y_{i,j}$ in block 330, may be predicted using either 1-D or 2-D prediction techniques. In 1-D prediction, the predictor intensity value $P_{i,j}$ for $Y_{i,j}$ is $Y_{i-1,j}$, i.e. the left neighbor of the current pixel. If the left pixel belongs to a different video data unit, or it is outside of the frame boundary, then a fixed predictor of $P_{i,j}=128$ is used instead. After the predictor of the current pixel is determined, index value $Idx_{i,j}$ for the current pixel at (i,j)th location is calculated by $Idx_{i,j}=Y_{i,j}-P_{i,j}$. In 2-D prediction, the predictor $P_{i,j}$ for $Y_{i,j}$ is based on the left and top neighbors of the current pixel. In some implementations, a combination of 1-D and 2-D prediction can be used. In some implementations, the processing order of pixels within a block and/or the processing order of blocks may also be changed according to the specific processing architecture being used in those implementations.

Following compression in lossless mode, the pixel may later be reconstructed during decompression by adding the index value to the predictor intensity value by $\hat{Y}_{i,j}=P_{i,j}+Idx_{i,j}$, where $\hat{Y}_{i,j}$ is the intensity value for a reconstructed pixel at (i,j)th location. For the lossless mode, $\hat{Y}_{i,j}=Y_{i,j}$.

In lossy mode, pixel prediction may be the same as in lossless mode. The index value for lossy mode may be calculated as follows: $Idx_{i,j}=Q(Y_{i,j}-P_{i,j})=[(Y_{i,j}-P_{i,j})+\text{offset}]>>qp\_bits$, where Q represents uniform scalar quantization and qp_bits is the quantization step size. The offset value can be calculated as offset=1<<(qp_bits−1), when qp_bits>0. Otherwise, if qp_bits=0, then offset=0. The qp_bits value may take any value from {0, 1, 2, 3}, or may also take greater integer values. However, as the value of qp_bits increases, compression ratio for the lossy mode also increases, and the quality consequently degrades. A quantization step size of qp_bits=0 is the equivalent of using the lossless mode. In some implementations, the offset may be set to zero for both lossy and lossless modes.

Following compression in lossy mode, the pixel may later be reconstructed during decompression by adding the inverse quantized value of the index to the predictor by $\hat{Y}_{i,j}=P_{i,j}+Q^{-1}(Idx_{i,j})$, where $\hat{Y}_{i,j}$ is the reconstructed pixel at (i,j)th location. Inverse quantization $Q^{-1}(Idx_{i,j})$ can be described as $Q^{-1}(Idx_{i,j})=(Idx_{i,j}<<qp\_bits)+\text{offset}$, where offset is defined as above.

Other techniques for prediction and/or indexing may also or alternatively be used within the context of this disclosure. The prediction and indexing techniques described above are for illustrative purposes only, and are not meant to limit the scope of this disclosure.

Figure 4:
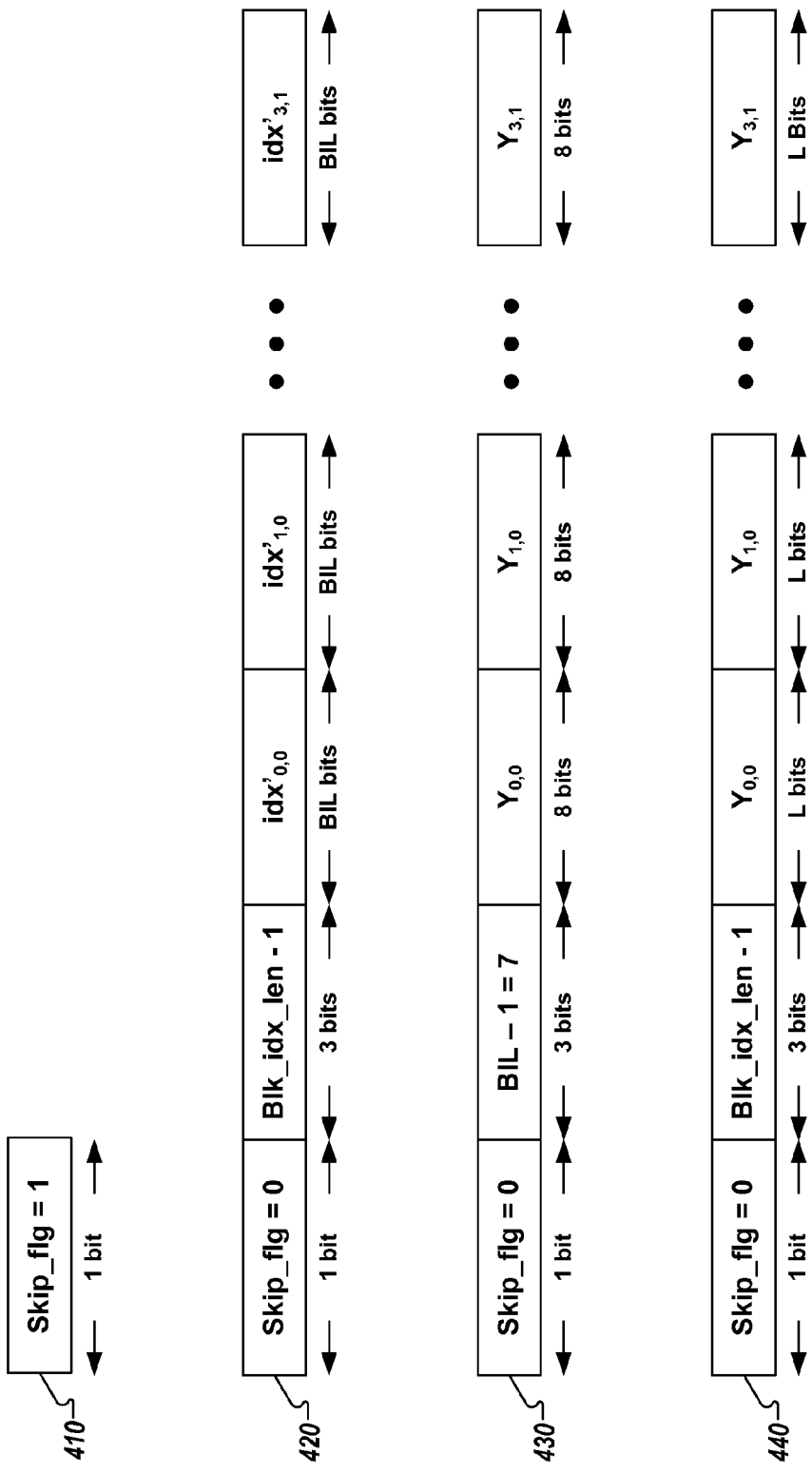
FIG. 4 is a conceptual diagram illustrating example compressed bitstreams.

FIG. 4 is a conceptual diagram illustrating example compressed bitstreams. The example compressed bitstreams are used to represent the values or the indices of the pixels in a block and header information in a stream of bits that may be transferred between video processing units. In the example compressed bitstreams shown, the blocks are each 4×2 coding units, but in some implementations the size of the blocks may be different depending on the architecture of the data processing units. Within a 4×2 block, there are eight indices, which may be calculated in raster scan order. In other implementations, the indices may be calculated in a column-wise order using a different technique for prediction and indexing.

In the architecture described herein, blocks may be coded using one of three different compression modes: skip mode, block fixed length coding (BFLC) mode, or pulse coded modulation (PCM) mode. The mode decision may be adaptive based on content. In other words, the mode that is used is not pre-selected, but rather may be dynamically determined during coding for each block based on the content of the block.

If all the indices in a 4×2 block are zero, then the block is coded as skip mode, and the block is called a "skip block" both for lossy and lossless modes. A 1-bit skip flag is set to "1" to indicate the skip mode. If a block is coded as "skip," then no further information is included in the bitstream, and the number of bits after compression is therefore one bit per block. Bitstream 410 shows the skip flag set to "1" and no subsequent bits are used to represent the block. If the indices in a block are not all zero, then the mode is set to "non-skip," and the skip flag is set to "0" to indicate the non-skip mode. In such a case, it is further determined whether BFLC or PCM mode is to be used.

BFLC mode is used when it is determined that coding the block in such a manner will use fewer bits than coding the block in PCM mode. This determination is based on a value that is referred to as the block index length, which corresponds to the length of the longest codeword used to represent an index in the particular block being coded.

In BFLC mode, the indices are coded using a fixed number of bits, which is equal to the block index length for the block. For each index within a block, a coded index (Idx') is calculated as $Idx'_{i,j}=(Idx_{i,j}<<1)$ XOR (signed bit). A list of some block indices and the corresponding codewords for lossless mode is shown in the following table. This table is an example assuming an eight bit per pixel input, but different bit depth inputs and different compression modes may result in different codeword tables being used. In some implementations, the codewords may be calculated according to a specific coding algorithm rather than using a lookup table to determine the codewords.

| Idx = Y − P | Idx' = codeword |
|---|---|
| 63 | 1111110 |
| 31 | 0111110 |
| 15 | 0011110 |
| 7 | 0001110 |
| 3 | 0000110 |
| 1 | 0000010 |
| 0 | 0000000 |
| −1 | 0000001 |
| −2 | 0000011 |
| −4 | 0000111 |
| −8 | 0001111 |
| −16 | 0011111 |
| −32 | 0111111 |
| −64 | 1111111 |

After the coded indices are calculated, the minimum number of bits to represent all the codewords within the block (i.e., the block index length) is determined by identifying the maximum non-zero bit position in a set of codewords. For example, assuming a set of indices in a block is {3, 7, 0, 0, 1, −1, 1, −2}, the length of the codewords for the index set is {3, 4, 0, 0, 2, 1, 2, 2}. As such, the block index length for this codeword set is four because all of the indices in the set may be represented using four bits or less. After determining the block index length for a block, the coded indices are packed in raster scan order using block index length bits for each index. If a codeword length is less than the block index length, then the codeword is padded with 0's for the unused bits. In the example above with the set of indices in a block being {3, 7, 0, 0, 1, −1, 1, −2}, the packed codewords are {0110, 1110, 0000, 0000, 0010, 0001, 0010, 0011}.

In BFLC mode, a bitstream representing the block may include a four-bit header. The first bit corresponds to the skip flag and is set to "0" to indicate non-skip mode. The three bits in the header after the skip flag correspond to a value of block index length−1. Bitstream 420 shows the skip flag set to "0". Continuing with the example above, the next three bits in the header correspond to the value of block index length−1, or "3" in the example. Following the header, bitstream 420 includes the indices for the block in raster scan order represented using codewords having block index length bit lengths, e.g., four-bit lengths. After compression, a block coded in BFLC mode has 4+8*block index length bits per block. Different implementations may reserve a different number of bits to represent the mode and block index length parameters.

If the block index length indicates that the BFLC mode will use as many or more bits to represent the coded block than PCM mode, then PCM mode is used instead. For example, if the block index length is greater than or equal to a defined threshold (e.g., eight in the example above) in lossless coding mode, then BFLC mode will not save any bits as compared to PCM mode. In such a case, the block is coded using PCM mode and the block is called a PCM block. In this mode, original pixels are coded instead of the indices coded in the BFLC mode.

In PCM lossless mode, a bitstream representing the block may include a four-bit header. The first bit corresponds to the skip flag and it is set to "0" to indicate non-skip mode. The next three bits represent the value of the block index length−1, which is equal to "7" for PCM mode where the block index length is eight. After the header, each pixel is individually coded using eight bits. Bitstream 430 shows a bitstream coded using PCM lossless mode. After compression, a block coded in PCM lossless mode has 4+8*8=68 bits per block.

In PCM lossy mode, if the block index length is greater than or equal to L, then BFLC mode does not save any bits. In such a case, the block is coded using PCM mode and the block is called a PCM block. In this mode, original quantized pixels are coded instead of the indices coded in the BFLC mode or the original pixels coded in the PCM lossless mode. The value L changes depending on the quantization step size (qp_bits) value described above.

Similar to the lossless case, a bitstream representing a PCM block in lossy mode may include a four-bit header. The first bit corresponds to the skip flag and it is set to "0" to indicate non-skip mode. The next three bits represent the value of block index length−1, which is equal to L−1 for PCM lossy mode. In PCM mode, the header bits representing block index length−1 can be equal to {7, 6, 5, 4} for qp_bits={0, 1, 2, 3}. After the header, each quantized pixel is coded using L bits. Bitstream 440 shows a bitstream coded using PCM lossy mode. After compression, a block coded in PCM lossy mode has 4+8*L bits per block.

The bits per block compressed block sizes described above relate to a block size of eight pixels, but as described above, other block sizes are possible within the context of this disclosure. It should be understood that changing the block size also affects the size of the coded blocks discussed above. For example, the general coded block size in the BFLC mode is 4+p*q*block index length, where p and q are the dimensions of the block in pixels. Furthermore, it should be understood that other compression techniques than those described above may also or alternatively be used within the context of this disclosure.

In some implementations, if the total number of bits used to compress a video data unit using the compression procedures described above is greater than the total number of bits that would otherwise be used to represent the uncompressed video data, then the whole video data unit may be coded using a PCM-VDU mode, and a one-bit header set to "1" may be used to indicate the PCM-VDU mode. If the total number of bits used to compress the video data unit is less than the total number of bits used to represent the uncompressed video data, then the video data unit is coded using non-PCM-VDU mode using the compression procedures described above. In such a case, the one-bit header may be set to "0" to indicate the non-PCM-VDU mode.

Figure 5C:
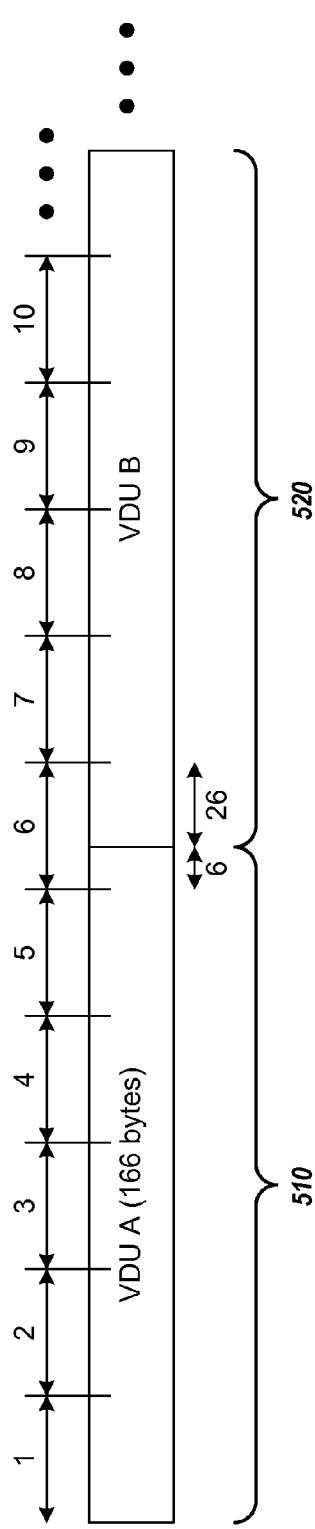

FIGS. 5A-5D are conceptual diagrams illustrating example uncompressed, compressed, and packed video data units. FIG. 5A illustrates uncompressed video data units in a 30×16 configuration, which represents a section of an image frame that is 1920×64 pixels (assuming a video data unit size of 64×4 pixels). Because they are uncompressed, each of the video data units occupies the same amount of memory, which is the maximum memory size for the video data units. As shown in the example, the maximum memory size for the video data units is 384 bytes. As such, VDU 1,1 occupies 384 bytes of memory, as do the rest of the individual data units.

FIG. 5B illustrates a similar section of video data units after they have been compressed. The textured portion of the video data units represents the memory that is saved by first compressing the video data units. For example, VDU 1,1 has been compressed to 300 bytes, which represents a memory savings of 84 bytes. Similarly VDU 2,1 has been compressed to 250 bytes, which represents a memory savings of 134 bytes.

Figure 5D:
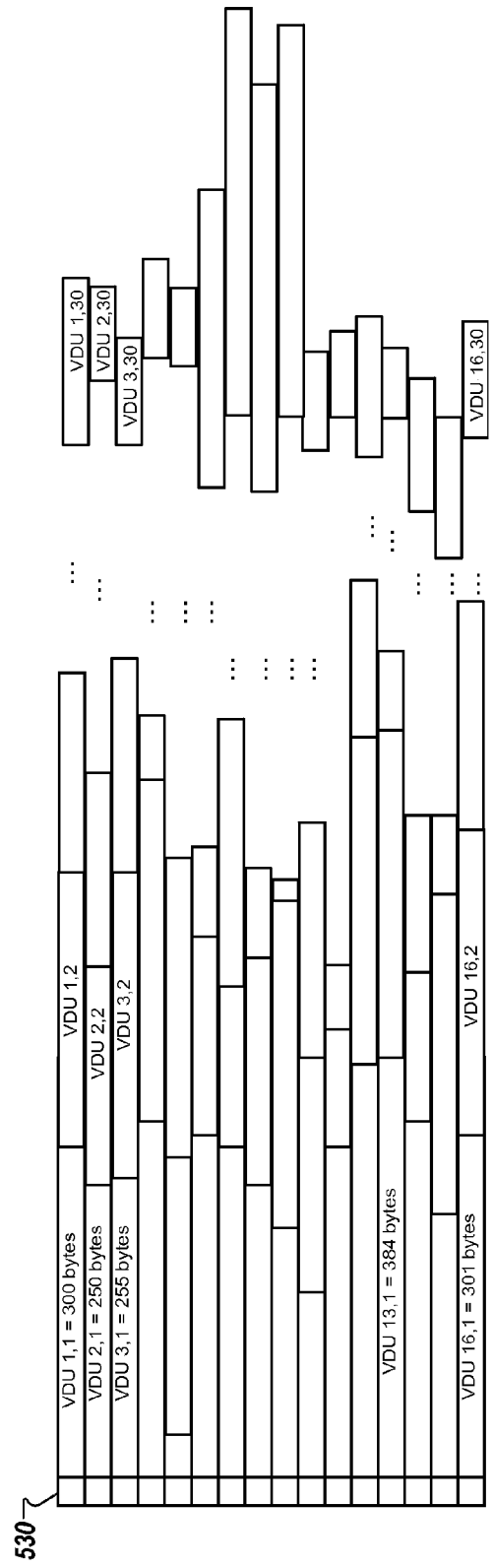

To realize the memory savings associated with the compression of the video data units, the video data units are also packed together by writing the compressed video data units contiguously in memory, as is shown in FIG. 5D. For example, the video data units may be packed in memory such that the beginning of a video data unit is written to a memory address adjacent to the memory address of the end of the previous video data unit. In some implementations, the video data units are packed in memory using a partial write-out procedure, which is illustrated in FIG. 5C. The video data units may be written to memory using a number of memory segments (e.g., beats or bursts of video data), which are numbered one through ten in the diagram, and continuing serially for the remainder of the video data units in the tile. The memory segments may have a fixed size, such that every memory segment is the same size, but the size of the fixed memory segments may vary amongst different architectures. In the example shown, the memory segments are each 32 bytes in size.

As shown in FIG. 5C, compressed VDU A 510 is 166 bytes, which is not divisible (i.e., indivisible) by the fixed memory segment size of 32 bytes. In implementations using a partial write-out procedure, a first portion of VDU A can be written to memory in five memory segments (32 bytes per memory segment*5 memory segments=160 bytes), which leaves six remaining bytes. The six remaining bytes may be stored until the next VDU (e.g., VDU B) is ready to be written to memory. The remaining portion of VDU A is written to memory in the first part of the sixth memory segment, and the first portion of VDU B may be written to memory as the second part of the sixth memory segment, with the rest of VDU B written in the following memory segments in a similar fashion. For example, if the size of VDU B minus the already written out 26 bytes is not divisible (i.e., indivisible) by the fixed memory segment size, then the remaining portion of VDU B will be stored, and will be written out to memory with the first portion of the next VDU (e.g., VDU C). Hence, a portion of the indivisible compressed video data unit is stored with a portion of another compressed video data unit in one of the memory segments. In other implementations that do not use a partial write-out procedure, VDU A can be written to memory using six full memory segments (32 bytes per memory segment*6 memory segments=192 bytes), and the extra 26 bytes (192 bytes−166 bytes) may be filled with 0s.

As the video data units of a row are being written to memory, information corresponding to the number of memory segments used to store the compressed video data units is collected. This information may be referred to as data storage information. For example, as each memory segment is written out, a segment counter may be incremented. The segment counter may be stored in memory as data storage information to allow the video data units to be retrieved from memory according to the fetch-in procedures described below. In some implementations, the segment counter may be stored contiguously with the memory segments in the memory, such as at the start of the row of compressed video data units, as indicated by memory location 530. In other implementations, the data storage information may be stored separately from the memory segments, e.g., in a non-contiguous portion of the memory or in a separate memory.

In other implementations, additional or different storage information may be collected and stored during the write-out procedure. For example, the specific size and/or location of each video data unit or groups of video data units may be collected and stored in memory. In such an implementation, individual or random video data units may be identified and retrieved from memory based on the storage information associated with a particular video data unit or group of video data units.

Fetch-in refers to a data processing unit retrieving the compressed video bitstream from the memory. To fetch-in the compressed video bitstream, the data processing unit first reads the data storage information from memory, e.g., from memory location 530. The data storage information may include, for example, the number of memory segments used to store the compressed video data units in memory during the write-out procedure. Then, the data processing unit may retrieve the memory segments following memory location 530 by retrieving the number of memory segments identified in the data storage information. Following retrieval, the compressed video data units may be decompressed using the decompression techniques described above, or by otherwise performing decompression techniques that are appropriate for the compression techniques that were utilized to compress the video data.

Figure 6:
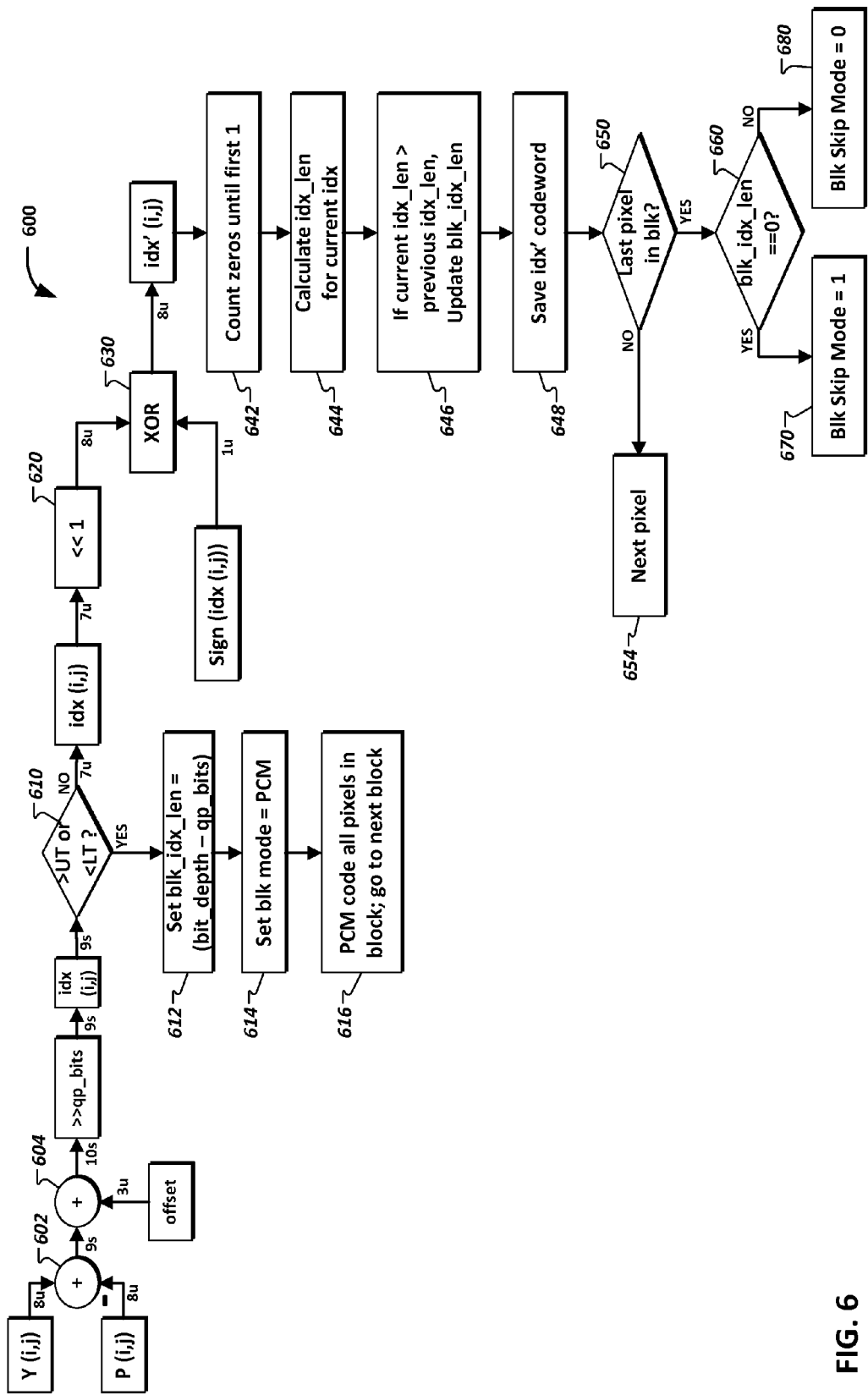
FIG. 6 is a block diagram illustrating an example process for determining a block compression mode.

FIG. 6 is a block diagram illustrating an example process 600 for determining a block compression mode. In some implementations, example process 600 may be used to dynamically determine the compression mode used to code the compressed bitstreams shown in FIG. 4. In process 600, the current pixel value $Y_{i,j}$ and predictor $P_{i,j}$ are fed to summer 602 to subtract the predictor from the pixel value. The results of summer 602 are further fed to summer 604 to add an offset that is based on the quantization step size, and may be calculated as offset=1<<(qp_bits−1), when qp_bits>0. Otherwise, if qp_bits=0, then offset=0. The results of summer 604 are then bit shifted to determine the index $idx_{i,j}$.

If the index is greater than an upper threshold (>UT), e.g., 63 for lossless compression of eight bit per pixel data, or less than a lower threshold (<LT), e.g., −64 for lossless compression of eight bit per pixel data (610), then the block index length is set to the difference between the bit depth and the quantization step size (612), the block mode is set to PCM mode (614), and all of the pixels in the block are coded in PCM mode (616). In other words, the indices that are coded are equal to the value of the original pixel. The example values for the upper and lower thresholds are provided for illustration purposes, but it should be understood that the values are implementation-specific and relate to whether coding in a non-PCM mode would use fewer bits than coding in PCM mode. As such, the upper and lower threshold values may more generally be determined as a function of the compression mode, bit depth of pixel, and the specific coding algorithm that is used for a given implementation.

If the index is not greater than the upper threshold or less than the lower threshold (610), then the index is bit shifted (620) and XOR'd with the signed bit of the index (630) to determine the coded index idx'. Next, the number of leading zeros before the first "1" in the coded index is determined (642), which corresponds to the index length for the current index (644). If the current index length is greater than any previous index lengths for the given block, then the block index length is updated to equal the current index length (646). The coded index idx' codeword is then saved (648).

If the current pixel is not the last pixel in the block (650), then process 600 processes the next pixel (654) as described above. Otherwise, it is determined whether the block index length is "0" (660). If it is, then the block skip mode is set to "1", and the block is coded using skip mode (670). If not, then the block skip mode is set to "0", and the block is coded using BFLC mode (680).

Figure 7:
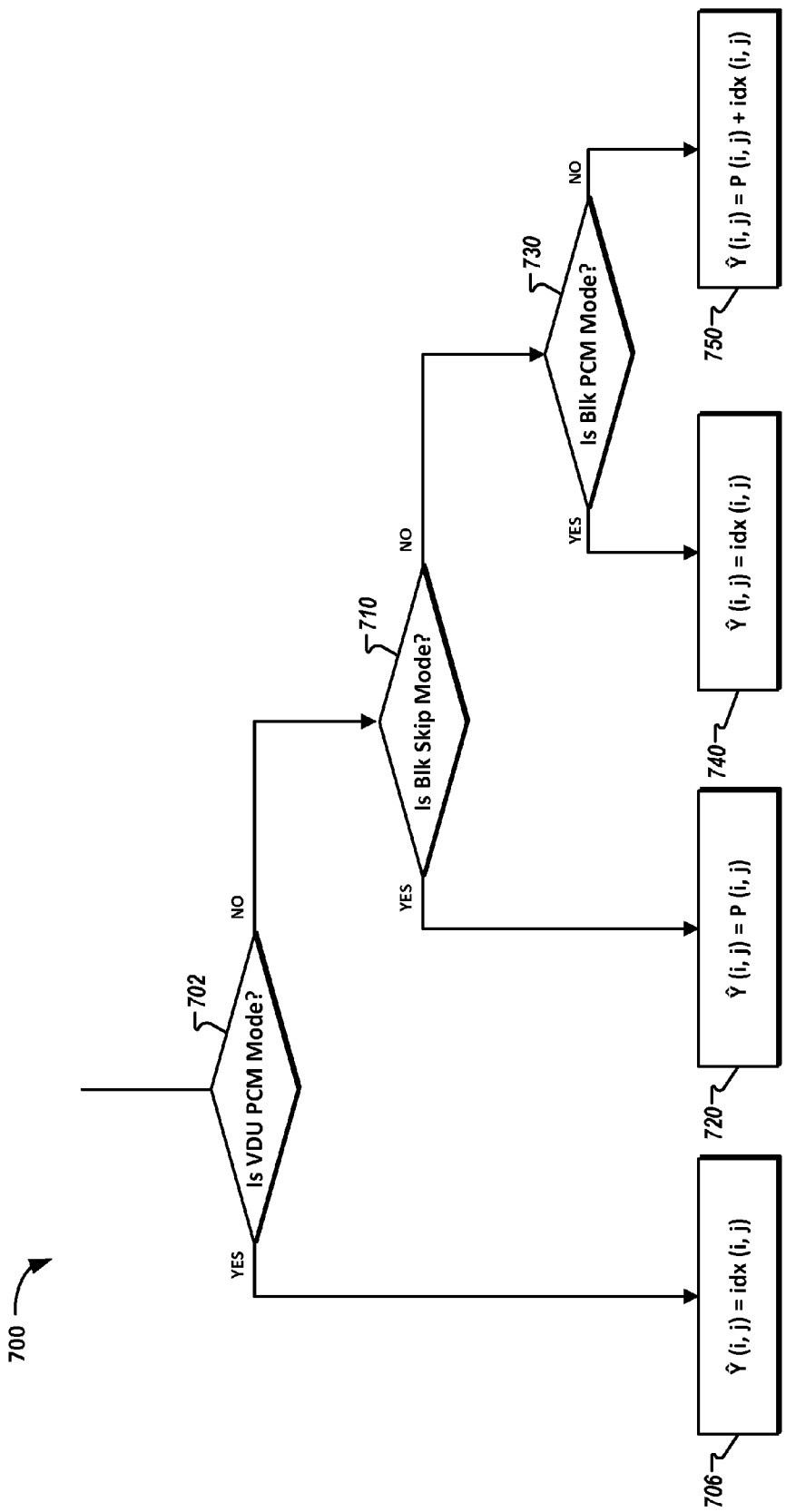
FIG. 7 is a flow diagram illustrating an example process for decompressing video data units.

FIG. 7 is a flow diagram illustrating an example process 700 for decompressing video data units. In some implementations, process 700 may be used by a data processing unit, e.g. Processing Unit B of FIG. 2, following fetch-in of a row of video data units to decompress the blocks of the video data units.

As described above, an entire video data unit may be coded using a PCM-VDU mode if the total number of bits used to compress the video data unit is greater than the total number of bits that would otherwise be used to represent the uncompressed video data. As such, it is first determined whether the video data unit was coded using PCM-VDU mode (702), e.g., by checking a one-bit header of a coded video data unit that indicates the video data unit coding mode. If the video data unit was coded using PCM-VDU mode, then the reconstructed pixels are equal to directly coded pixels. As such, reconstructed pixel $\hat{Y}_{i,j}$ is equal to $\text{idx}_{i,j}$ (706), where coded indices ($\text{idx}_{i,j}$) are equal to the value of the original pixels in lossless compression mode and the quantized value of the original pixel in lossy compression mode.

If the video data unit was not coded using PCM-VDU mode, then it is determined whether the block was coded using block skip mode (710). For example, if the skip flag contained in the first bit of a block bitstream header is set to "1", e.g., bitstream 410 of FIG. 4, then all of the indices of the block are of value zero. As such, reconstructed pixel $\hat{Y}_{i,j}$ is equal to $P_{i,j}$ (720).

If the block is not determined to be coded using skip mode (710), then it is determined if the block was coded using PCM mode (730). Whether the block was coded using PCM mode may be determined, for example, by evaluating the bits in the bitstream header following the first header bit (the skip flag bit). These bits contain the value of the block index length−1, which is different for BFLC mode and PCM mode as described above.

If the block was coded using PCM mode, then the pixels are reconstructed using the formula $\hat{Y}_{i,j}=\text{idx}_{i,j}$ (740) because the indices of the block are equal to the original pixel values $Y_{i,j}$ in PCM mode. If the block was not coded using PCM mode, then the pixels are reconstructed using the formula $\hat{Y}_{i,j}=P_{i,j}+\text{idx}_{i,j}$ (750).

Figure 8:
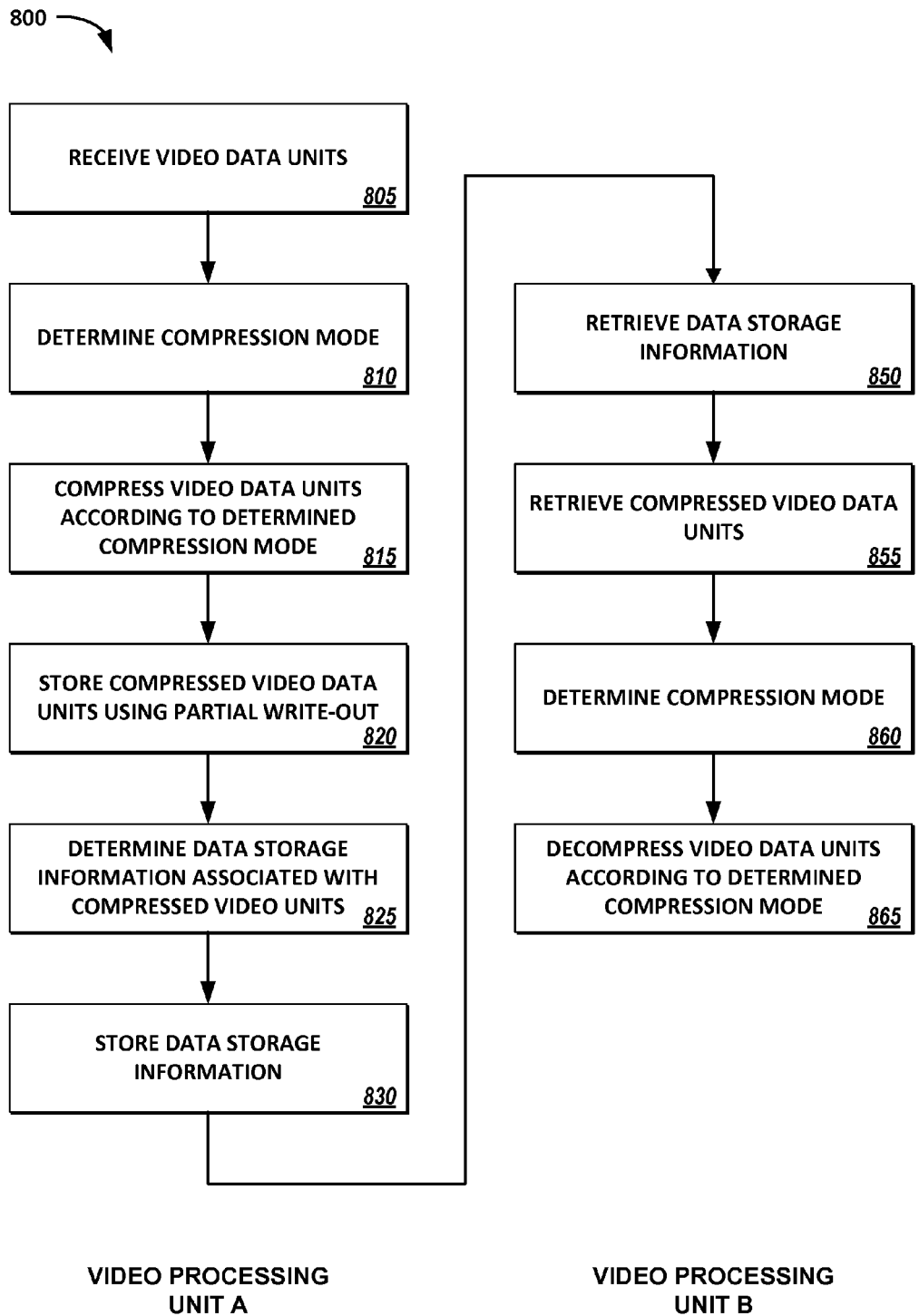
FIG. 8 is a flow diagram illustrating an example process for transferring video data units from one video processing unit to another video processing unit.

FIG. 8 is a flow diagram illustrating an example process 800 for transferring video data units from one video processing unit to another video processing unit. The process begins when a first video processing unit (Unit A) receives video data units (805). For example, the video data units may have been retrieved from another video processing unit utilizing the techniques described in this disclosure. As another example, Unit A may retrieve the video data units from an uncompressed frame of video data.

Unit A then determines the compression mode to be used for coding the video data units (810), and compresses the video data units according to the determined compression mode (815). For example, Unit A may utilize the compression procedures described in greater detail above to dynamically determine which of three compression modes (skip mode, BFLC mode, or PCM mode) should be used for each block of a given video data unit, as well as the compression mode for the video data unit, either PCM or non-PCM.

Unit A then stores the compressed video data units to memory using the partial write-out procedure described above (820). While storing the compressed video data units to memory, Unit A may keep track of how many memory segments it has written to memory, or may otherwise determine data storage information associated with storing the compressed video data units (825), and stores the data storage information in memory (830). Data storage information may include, for example, information indicating the number of memory segments (e.g., beats or bursts) used to write the compressed video data units to memory, the size of individual video data units and/or groups of video data units, the location of individual video data units and/or groups of video data units, and the like.

Following this procedure, Unit A will have written to memory a group of compressed video data units that represent a section or tile of a frame of video data. For example, the resulting memory may resemble the compressed and packed video data units shown in FIG. 5D. Compared to an uncompressed storage of such data (as is represented by data storage in FIG. 5A), such compression, packing, and storing techniques may result in a reduction of the amount of video data that is transferred between Unit A and Unit B.

To retrieve the compressed video data units from memory and reconstruct the original pixels, Unit B first retrieves the data storage information (850). For example, in some implementations, Unit B may follow a pointer to a pre-determined address in memory that represents the beginning of a row of video data units. The data storage information may be stored immediately preceding the beginning of such a row, e.g., in a row header, and may identify the number of memory segments that were used to store the video data units for that row in memory. In other implementations, the data storage information may be stored in a different portion of the memory, or in a separate memory.

Unit B then retrieves the compressed video data units based on the data storage information (855). For example, if the data storage information indicates that fifty memory segments were used to store the row of compressed video data units, then the next fifty memory segments are retrieved from memory. In other implementations, the data storage information may also include information identifying the size and/or location of each video data unit, and Unit B may use such information to identify individual video data units or groups of video data units for retrieval.

After retrieval of the video data units, Unit B may then reconstruct the original pixels contained in the video data units. To reconstruct the original pixels, Unit B may determine the compression mode that was used to code each block of the video data units (860), and may decompress the video data units according to the determined compression mode (865). For example, Unit B may implement process 700 of FIG. 7 to determine the compression mode for each block in the video data units, and to reconstruct the pixels accordingly. In other implementations, when other compression techniques are utilized, Unit B may generally perform the inverse of the operations performed to compress the video data units to reconstruct the pixels in the retrieved video data units.

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, etc.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium, e.g., a non-transitory storage medium, comprising instructions that, when executed, performs one or more of the methods described above. The computer-readable data storage medium may comprise a tangible computer readable storage medium, and in some cases, may form part of a computer program product, which may include packaging materials.

The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method comprising:
receiving, at a video processing unit of a video processing apparatus, video data units;
compressing the video data units to generate compressed video data units that have a variable size;
storing the compressed video data units contiguously in a memory in memory segments that have a fixed size, wherein:
the size of a first compressed video data unit of the compressed video data units is indivisible by the fixed size of the memory segments;
a first portion of the first compressed video data unit is stored in a first memory segment of the memory segments; and
a second portion of the first compressed video data unit is stored in a second memory segment of the memory segments with at least a portion of a second compressed video data unit of the compressed video data units;
determining data storage information associated with the first compressed video data unit that comprises a number of memory segments used to store the first compressed video data unit; and
storing the data storage information in the memory.

2. The method of claim 1, further comprising:
retrieving the data storage information from the memory; and
retrieving the first compressed video data unit from the memory based on the data storage information.

3. The method of claim 2, wherein the data storage information is stored contiguously with the memory segments in the memory.

4. The method of claim 1, wherein the data storage information comprises, for the first compressed video data unit, unit size information that corresponds to the number of memory segments used to store the first compressed video data unit.

5. The method of claim 1, wherein compressing the video data units comprises:
determining for each block in the video data unit a compression mode based on content and block index length of the block; and
compressing each block in the video data unit according to the determined compression mode, wherein the block index length of the block corresponds to a number of bits used to represent codewords within the block.

6. The method of claim 5, wherein determining the compression mode comprises:
selecting a skip mode if all indices in the block contain zero values;
selecting a block fixed length coding mode if one or more indices in the block contains non-zero values and the block index length is less than a threshold length; and
selecting a pulse coded modulation mode if one or more indices in the block contains non-zero values and the block index length is equal to or greater than the threshold length.

7. The method of claim 5, further comprising:
retrieving the compressed video data units from the memory;
determining for each block in the compressed video data units a compression mode; and
decompressing each block in the compressed video data units according to the determined compression mode.

8. The method of claim 1, wherein each of the video data units is self-decodable such that prediction of pixels in a current video data unit is based on pixels that are in the current video data unit and is not based on pixels that are in other video data units.

9. The method of claim 1, wherein the first memory segment and the second memory segment are continuous segments in the memory.

10. The method of claim 1, wherein the first portion of the first compressed video data unit and the second portion of the first compressed video data unit are separate portions of the first compressed videos data unit.

11. The method of claim 1, wherein the second portion of the first compressed video data unit and the at least a portion of the second compressed video data unit have different sizes.

12. A non-transitory computer-readable storage medium encoded with computer executable instructions that, when executed, cause one or more processors to:
receive video data units;
compress the video data units to generate compressed video data units that have a variable size;
store the compressed video data units contiguously in a memory in memory segments that have a fixed size, wherein:
the size of a first compressed video data unit of the compressed video data units is indivisible by the fixed size of the memory segments;
a first portion of the first compressed video data unit is stored in a first memory segment of the memory segments; and
a second portion of the first compressed video data unit is stored in a second memory segment of the memory segments with at least a portion of a second compressed video data unit of the compressed video data units;
determine data storage information associated with the first compressed video data unit that comprises a number of memory segments used to store the first compressed video data unit; and
store the data storage information in the memory.

13. The non-transitory computer-readable storage medium of claim 12, further comprising instructions that, when executed, cause the one or more processors to:
retrieve the data storage information from the memory; and
retrieve the first compressed video data unit from the memory based on the data storage information.

14. The non-transitory computer-readable storage medium of claim 13, wherein the data storage information is stored contiguously with the memory segments in the memory.

15. The non-transitory computer-readable storage medium of claim 12, wherein the data storage information comprises, for the first compressed video data unit, unit size information that corresponds to the number of memory segments used to store the first compressed video data unit.

16. The non-transitory computer-readable storage medium of claim 12, wherein the instructions to compress the video data units further comprise instructions that, when executed, cause the one or more processors to:
determine for each block in the video data unit a compression mode based on content and block index length of the block; and
compress each block in the video data unit according to the determined compression mode, wherein the block index length of the block corresponds to a number of bits used to represent codewords within the block.

17. The non-transitory computer-readable storage medium of claim 16, wherein the instructions to determine the compression mode further comprise instructions that, when executed, cause the one or more processors to:
select a skip mode if all indices in the block contain zero values;
select a block fixed length coding mode if one or more indices in the block contains non-zero values and the block index length is less than a threshold length; and
select a pulse coded modulation mode if one or more indices in the block contains non-zero values and the block index length is equal to or greater than the threshold length.

18. The non-transitory computer-readable storage medium of claim 16, further comprising instructions that, when executed, cause the one or more processors to:
retrieve the compressed video data units from the memory;
determine for each block in the compressed video data units a compression mode; and
decompress each block in the compressed video data units according to the determined compression mode.

19. The non-transitory computer-readable storage medium of claim 12, wherein each of the video data units is self-decodable such that prediction of pixels in a current video data unit is based on pixels that are in the current video data unit and is not based on pixels that are in other video data units.

20. An apparatus comprising:
a memory; and
a first video data processing module configured to receive video data units, compress the video data units to generate compressed video data units that have a variable size, store the compressed video data units contiguously in the memory in memory segments that have a fixed size, wherein the size of a first compressed video data unit of the compressed video data units is indivisible by the fixed size of the memory segments, a first portion of the first compressed video data unit is stored in a first memory segment of the memory segments, and a second portion of the first compressed video data unit is stored in a second memory segment of the memory segments with at least a portion of a second compressed video data unit of the compressed video data units,
determine data storage information associated with the first compressed video data unit that comprises a number of memory segments used to store the first compressed video data unit, and store the data storage information in the memory.

21. The apparatus of claim 20, further comprising a second video data processing module configured to retrieve the data storage information from the memory, and retrieve first compressed video data unit from the memory based on the data storage information.

22. The apparatus of claim 21, wherein the data storage information is stored contiguously with the memory segments in the memory.

23. The apparatus of claim 20, wherein the data storage information comprises, for the first compressed video data unit, unit size information that corresponds to the number of memory segments used to store the first compressed video data unit.

24. The apparatus of claim 20, wherein to compress the video data units, the first video data processing module is configured to:
determine for each block in the video data unit a compression mode based on content and block index length of the block; and
compress each block in the video data unit according to the determined compression mode, wherein the block index length of the block corresponds to a number of bits used to represent codewords within the block.

25. The apparatus of claim 24, wherein to determine the compression mode, the first video data processing module is configured to:
select a skip mode if all indices in the block contain zero values;
select a block fixed length coding mode if one or more indices in the block contains non-zero values and the block index length is less than a threshold length; and
select a pulse coded modulation mode if one or more indices in the block contains non-zero values and the block index length is equal to or greater than the threshold length.

26. The apparatus of claim 24, further comprising a second video data processing module configured to:
retrieve the compressed video data units from the memory;
determine for each block in the compressed video data units a compression mode; and
decompress each block in the compressed video data units according to the determined compression mode.

27. The apparatus of claim 20, wherein each of the video data units is self-decodable such that prediction of pixels in a current video data unit is based on pixels that are in the current video data unit and is not based on pixels that are in other video data units.

28. The apparatus of claim 20, wherein the apparatus comprises at least one of:
an integrated circuit;
a microprocessor; or
a wireless communication device that includes the memory and the first video data processing module.

29. An apparatus comprising:
means for receiving video data units;
means for compressing the video data units to generate compressed video data units that have a variable size;
means for storing the compressed video data units contiguously in a memory in memory segments that have a fixed size, wherein:

the size of a first compressed video data unit of the compressed video data units is indivisible by the fixed size of the memory segments;
a first portion of the first compressed video data unit is stored in a first memory segment of the memory segments; and
a second portion of the first compressed video data unit is stored in a second memory segment of the memory segments with at least a portion of a second compressed video data unit of the compressed video data units;
means for determining data storage information associated with the first compressed video data unit that comprises a number of memory segments used to store the first compressed video data unit; and
means for storing the data storage information in the memory.

30. The apparatus of claim 29, further comprising:
means for retrieving the data storage information from the memory; and
means for retrieving the first compressed video data unit from the memory based on the data storage information.

31. The apparatus of claim 30, wherein the data storage information is stored contiguously with the memory segments in the memory.

32. The apparatus of claim 29, wherein the data storage information comprises, for the first compressed video data unit, unit size information that corresponds to the number of memory segments used to store the first compressed video data unit.

33. The apparatus of claim 29, wherein the means for compressing the video data units comprises:

means for determining for each block in the video data unit a compression mode based on content and block index length of the block; and
means for compressing each block in the video data unit according to the determined compression mode, wherein the block index length of the block corresponds to a number of bits used to represent codewords within the block.

34. The apparatus of claim 33, wherein the means for determining the compression mode comprises:
means for selecting a skip mode if all indices in the block contain zero values;
means for selecting a block fixed length coding mode if one or more indices in the block contains non-zero values and the block index length is less than a threshold length; and
means for selecting a pulse coded modulation mode if one or more indices in the block contains non-zero values and the block index length is equal to or greater than the threshold length.

35. The apparatus of claim 33, further comprising:
means for retrieving the compressed video data units from the memory;
means for determining for each block in the compressed video data units a compression mode; and
means for decompressing each block in the compressed video data units according to the determined compression mode.

36. The apparatus of claim 29, wherein each of the video data units is self-decodable such that prediction of pixels in a current video data unit is based on pixels that are in the current video data unit and is not based on pixels that are in other video data units.

* * * * *